March 12, 1968 T. P. WEAVER 3,372,953
GLARE SHIELD

Filed July 28, 1965 3 Sheets-Sheet 1

INVENTOR
THERON P. WEAVER
BY Hood, Gust & Irish
ATTORNEYS

March 12, 1968 T. P. WEAVER 3,372,953
GLARE SHIELD

Filed July 28, 1965 3 Sheets-Sheet 3

INVENTOR
THERON P. WEAVER
BY Hood, Gust & Irish
ATTORNEYS

United States Patent Office 3,372,953
Patented Mar. 12, 1968

3,372,953
GLARE SHIELD
Theron P. Weaver, 2621 Indiana Ave.,
Fort Wayne, Ind. 46807
Filed July 28, 1965, Ser. No. 475,477
4 Claims. (Cl. 296—97)

ABSTRACT OF THE DISCLOSURE

An apparatus for reducing glare in localized areas having a sheet of transparent material with glare-reducing properties pivotally and swivelly connected to a bracket for mounting a device to a vehicle with an elongated and telescoping neck portion therebetween. The glare-reducing sheet has a shape of a parallelogram with pairs of opposite corners being acute and obtuse, respectively. The glare-reducing sheet is pivotally connected to the neck portion so as to be movable with respect to the neck portion about two different axes generally perpendicular to each other and to the neck portion. The neck portion is telescopically extensible and retractable and is swivelly connected to said mounting bracket. Each of the connections between the respective parts of the apparatus is supplied with suitable friction, whereby the glare-reducing sheet may be selectively positioned in the line of sight of localized glare.

---

The present invention relates to a glare shield, and more specifically, to a glare shield which can be readily mounted on the windshield molding inside a motor vehicle and selectively positioned in the driver's line of sight to reduce glare in localized areas.

Glare from the headlights of on-coming vehicles, early morning or late afternoon sun, or reflected sunrays have often bothered the eyes of the drivers of motor vehicles and impaired their vision. Glare can blind the driver, irritate the driver's eyes or impair the binocularity of the driver's eyes. Without binocular vision, a driver cannot judge the distances nor the speeds of oncoming vehicles. Tinted windshields are only a partial solution to these difficulties. While tinted windshields can reduce glare, tinted windshields can also reduce the vision of the driver. This is especially true when tinted windshields are used while driving at night. Thus, the glare-reducing properties of tinted windshield must be limited such that the driver's vision is not dangerously impaired; however, when this is done, a tinted windshield will not reduce glare to the degree required. The use of sunglasses of course has long been recognized as a means for reducing glare while driving. However, the use of sunglasses has the same disadvantage as the use of tinted windshields in that either glare is reduced and the driver's vision is correspondingly reduced, or no glare reduction is possible.

The present invention differs in principle from the use of tinted windshields and sunglasses in that the present invention is designed to reduced the glare in localized areas to the degree required to prevent the driver's vision from being impaired. Thus, only in that localized area defined by the driver's line of sight of the glare-producing device and a relatively small area surrounding the driver's image thereof is the glare shield of this invention used. It has been found that by use of such a glare-reducing device, the driver's eyes, and thus his vision, are unaffected by the glare from a localized source and the driver can view other objects with his normal unimpaired vision. Thus, for example, a sheet of substantially transparent colored glass having glare-reducing properties can be placed in the driver's line of sight of on-coming head lights at night, the sheet having a size only slightly larger than the image of the head lights, and the driver can view all portions of the road not covered by the tinted glass with his normal, unimpaired vision. Therefore, it is highly desirable to provide a relatively small glare shield which is adjustable in position by the driver so that he may place the glare shield in his line of vision of glare-producing objects thereby to maintain his normal vision.

While other glare-reducing devices have been proposed for use with motor vehicles to reduce glare which impairs the vision of the driver, each of these devices has been secured either to the conventional sun-visor of the vehicle or to the interior surface of the windshield, and thus, are limited as to the locations in which the device may be positioned. For this reason, all of such prior devices known to the present applicant are substantially larger in area than the image of most glare-producing objects. Also, for this reason, only a portion of each of these prior devices actually functions to reduce glare; the remainder of each of the devices is superfluous and functions unnecessarily to reduce the vision of the driver of non-glare-producing objects. Further, those devices which are secured to the conventional sun-visor of a motor vehicle can only be used when the visor is in operating position. Since conventional sun-visors are generally opaque and a portion of the windshield is covered by the sun-visor when in use and a further portion of the windshield is covered by any of the aforementioned prior devices, the driver's view of objects through the windshield can be substantially obstructed by their use. Therefore, it is highly desirable to provide a glare shield which can be used irrespective of the position of the conventional sun-visor and which itself covers only a relatively small area of the windshield thereby leaving a substantial area of the windshield unobstructed.

Further, the prior devices above-mentioned, since they are either attached to the interior of the windshield or to the conventional sun-visor, can not be positioned in that area between the ends of the conventional sun-visor and the ends of the windshield adjacent the top edge thereof through which glare from early morning or late afternoon sun is normally viewed. Thus, it is further desirable to provide a glare shield which can be adjusted into position on either side of the conventional sun-visor adjacent the top edge of the windshield.

Therefore, it is the primary object of this invention to provide a glare-reducing device only slightly larger than the image of glare-producing objects and which is adjustable into a variety of positions so that the driver can position the device in his line of sight of the glare-producing object.

A further object of this invention is to provide a glare shield which can be mounted on the windshield molding inside a motor vehicle and positioned irrespective of the position of the conventional sun-visor in the driver's line of sight of glare-producing objects, and which, if not needed, can be positioned so as to not obstruct the vision of the driver.

Still further an object of this invention is to provide an improved glare-reducing device which can be selectively positioned in the line of sight of the driver of glare-producing objects and which, when in use, obstructs only a small portion of the driver's vision through the windshield.

The above-mentioned and other features and objects of this invention and the manner of attaining them will become more apparent and the invention itself will be best understood by reference to the following description of an embodiment of the invention taken in conjunction with the accompanying drawings, wherein.

Figure 2:
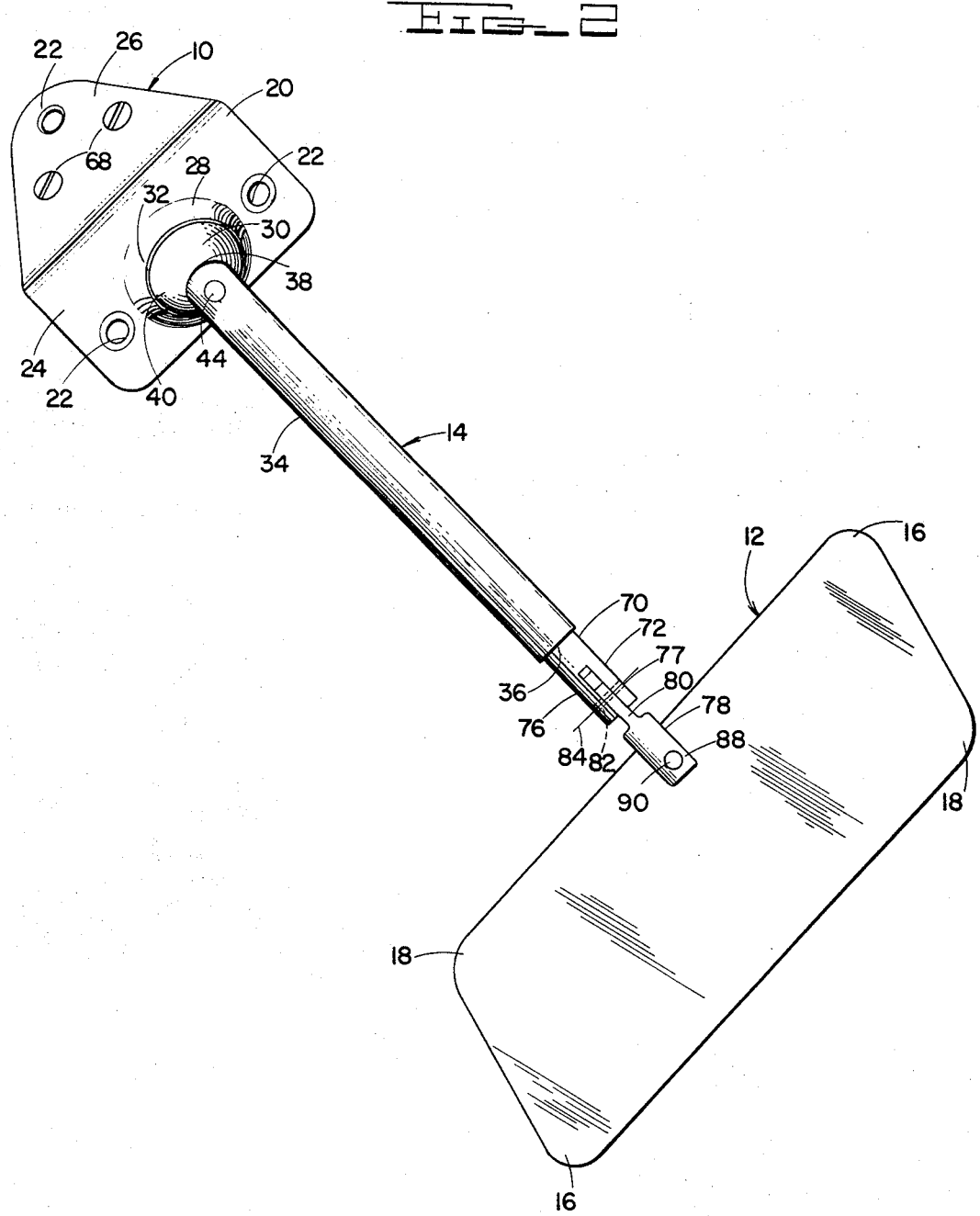
FIG. 2 is a top view of the glare shield of this invention.
Figure 3:
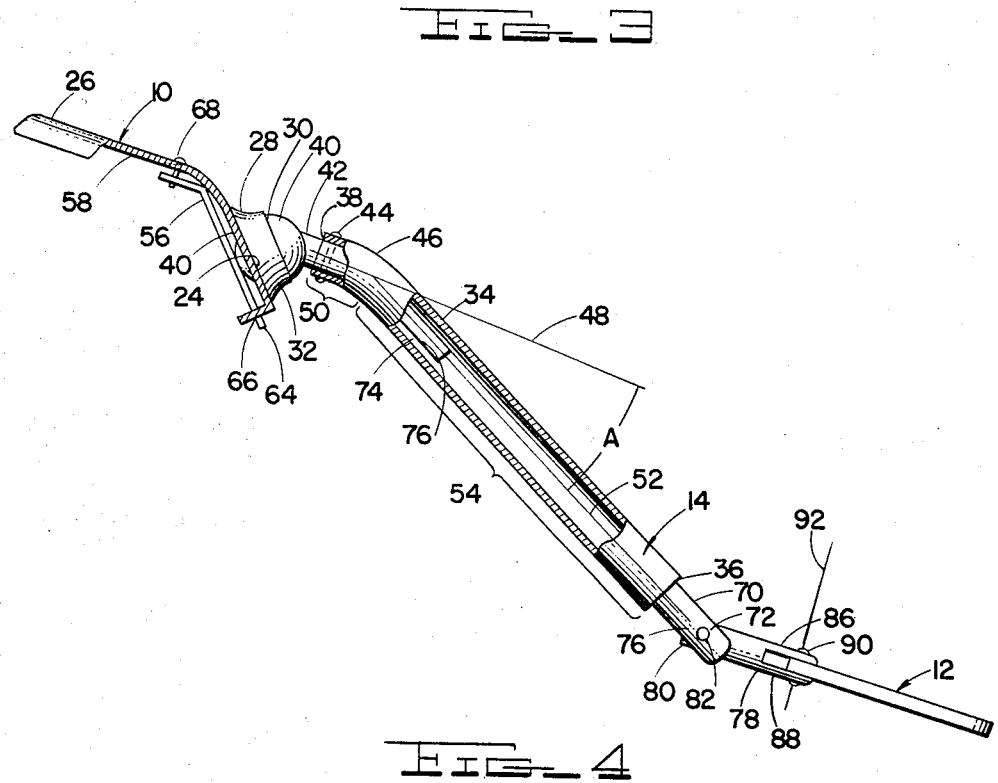
Figure 4:
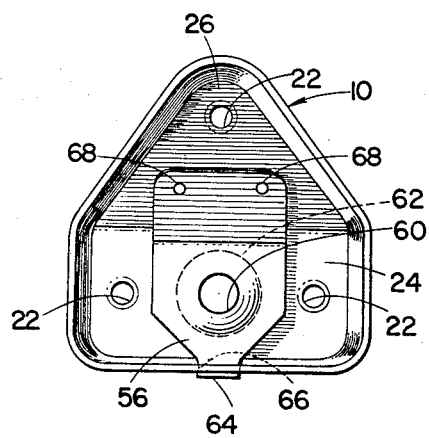

FIG. 3 is a fragmentary and broken away side view of the glare shield illustrated in FIG. 2 showing the specific manner in which one embodiment of this invention is constructed; and FIG. 4 is a bottom view of the mounting bracket of the glare shield of this invention which swivelley attaches the same to a motor vehicle showing, in combination with the illustration of FIG. 3, the structure of the mounting bracket which allows the glare shield to be first positioned in the desired location and then frictionally held therein against further movement.

In the broader aspects of this invention there is provided a sheet of substantially transparent material having glare-reducing properties which is both swivelly and pivotally connected to a mounting bracket by an elongated neck portion and which has frictional means at the juncture of the neck portion with the mounting bracket and the juncture of the neck portion with the above-mentioned sheet for restraining movement therebetween whereby the sheet can be placed adjacent the interior surface of a vehicle windshield and in the line of sight of glare-producing objects and frictionally held against movement therefrom.

Referring now to the drawings, there is shown an improved device for reducing glare in localized areas comprising generally a mounting bracket 10, a sheet 12 of colored, substantially transparent material having glare-reducing properties which is both pivotally and swivelly connected to the mounting bracket 10 by an elongated neck portion 14.

Sheet 12 is shown generally to have a shape of a parallelogram with pairs of opposite rounded corners 16 and 18 which are acute and obtuse, respectively. The sheet 12, as aforementioned, is colored and substantially transparent. Further, because of the use of the device of this invention mentioned hereinafter, the sheet 12 can be uniformly colored and thereby have uniform glare-reducing properties. Still further, the sheet 12 can have glare-reducing properties substantially more effective than prior known tinted windshields or sunglasses; however, the sheet 12 can be made of substantially the same materials from which the tinted windshields and sunglasses have previously been made. In the specific embodiment illustrated, the sheet 12 generally measures five inches by two inches and has angles 16 of about seventy degrees and angles 18 of about one hundred ten degrees, respectively.

Mounting bracket 10 comprises a base 20 which is integrally formed with counter-sunk openings 22 therein which provide means for mounting the bracket 10 onto the vehicle as desired. In the specific embodiment illustrated, the mounting bracket 10 has three such openings 22, two of which are positioned adjacent opposite ends of a lower portion 24 of the base 20 and one of which is positioned in the upper portion 26 thereof. Intermediate the two openings 22 in the lower portion 24 is integrally formed a socket 28. Socket 28 has an opening 30 therein, a collar 32, and an interior surface is part-spherical.

Figure 1:
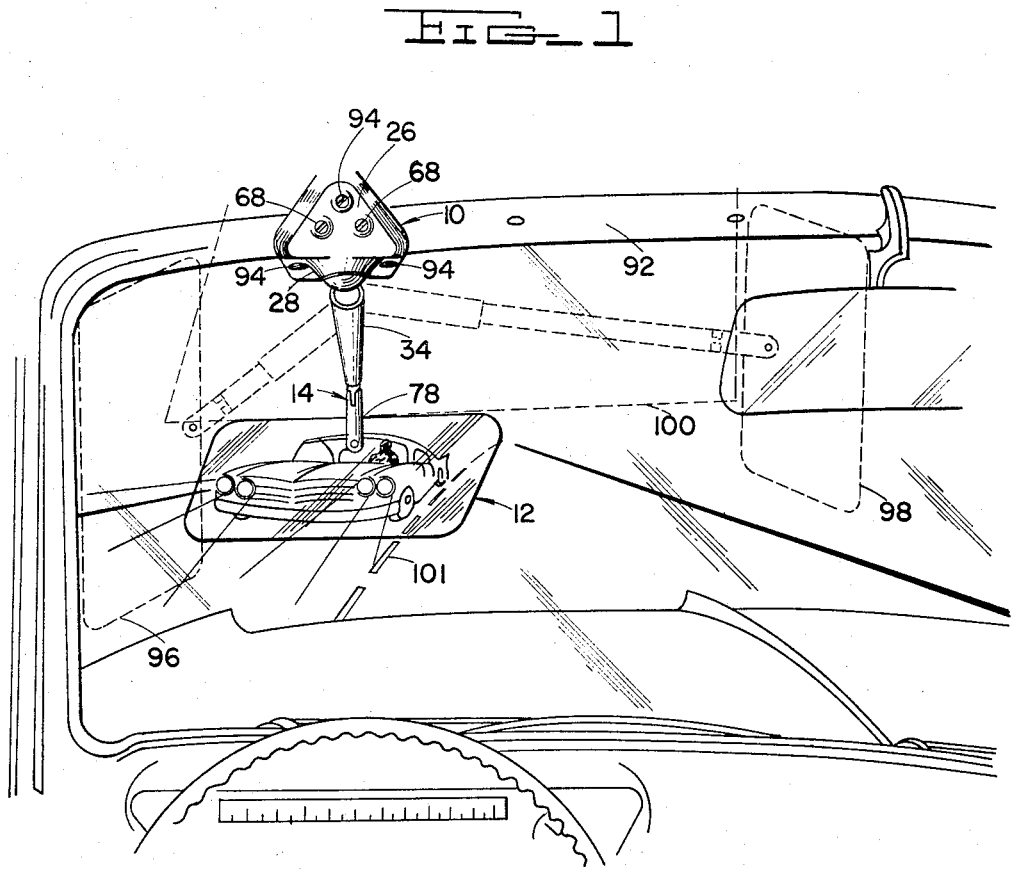
FIG. 1 is a fragmentary, perspective illustration showing the improved glare-reducing device of this invention mounted inside a motor vehicle and in the driver's line of sight of the head lights of on-coming vehicles, and illustrating two alternative positions of the device of this invention and the operating position of the conventional sun-visor of the vehicle in dotted lines.

Neck portion 14 is composed of a tubular member 34 which has an open end 36 and an opposite end 38. Secured to the end 38 is a ball member 40, which, in the specific embodiment illustrated, has a neck portion 42 integrally formed thereon and secured within the tubular member 34 by means of a pin 44 inserted through the neck portion 42 and secured at the opposite ends thereof to member 34. Intermediate ends 36 and 38, but adjacent end 38, tubular member 34 is bent at position 46. The degree of this bend in member 34 is defined by angle A between the axes 48 and 52 of the portions 50 and 54 of the tubular member 34 on opposite sides of point 46, respectively. In a specific installation as shown in FIG. 1, the portion 24 of bracket 10 is mounted generally horizontally such that the socket 28 will extend downwardly and the angle A is about thirty degrees. Ball member 40 is positioned within socket 28 and partially held therein by the interior surfaces of the socket 28 and the collar 32. The size of the opening 30 is such that the ball member 40 cannot pass therethrough. Further, holding the ball member 40 within the socket 28 is plate 56 which is secured adjacent to the underside surface 58 of the bracket member 10. Plate 56 has an opening 60 therein and a part-spherical surface 62 surrounding the opening 60 which engages the ball member 40 and which, combined with the interior surface of collar 32, provides a socket in which the ball member 40 is swivelly secured. Plate 56 is secured into position at one end by a tongue member 64 inserted in an opening 66 in the base member 10 and at the other end by a pair of screws 68. Plate member 56, as shown in the figures, is positioned substantially parallel and spaced apart from the interior surface 58 of the bracket 10. In such a position, the screws 68 securing the plate 56 to the bracket 10 serve another function. As is obvious from the drawing of FIG. 3, the tightening of screws 68 urges the plate 56 toward the interior surface 58 of the bracket 10 and the ball member 40 into the socket 28. Thus, by tightening and loosening screws 68, the frictional forces between the socket 28 and the ball member 40 can be selectively adjusted. Therefore, whenever the ball member 40 is desirably secured in position within the socket 28, screws 68 are tightened to achieve that result. On the other hand, loosening screws 68 will allow the ball member 40 to freely and swivelly move in the socket 28.

Further comprising the neck portion 14 is a rod member 70 having a yoke portion 72 adjacent one end and an expanded portion 74 adjacent the opposite end. Yoke portion 72 has a pair of arm portions 76 and 77. Expanded portion 74, formed by an axially extending slot 76 being cut into the rod 70 and extending from the rod end and between opposite portions of the rod surface, is fitted into the tubular portion 34 and is frictionally engaged with the interior surface thereof. Thus, the rod 70 is telescoped within the tubular member 34, and more specifically, in the portion 54 thereof. By choosing the rod 70 to be longer than portion 54 of member 34, yoke portion 72 of the rod 70 is always positioned exterior of the member 34. Secured to the arm portions 76 and 77 of the yoke portion 72 is a fork member 78. Fork 78 has an end portion 80 which fits between the arm portions 76 and 77 of the yoke portion 72 and is pivotally secured therein by means of a pin 82 which extends through end portion 80 and is secured at its opposite ends to arm portions 76 and 77, respectively. Thus secured, fork 78 is rotatable about the axis 84 of pin 82. Fork 78 adjacent the opposite end thereof has a pair of spaced apart leg portions 86 and 88. Inserted between leg portions 86 and 88 is sheet 12. A pin 90 is inserted through the sheet 12 and secured to the leg portions 86 and 88 adjacent its opposite ends. Sheet 12 is thereby pivotally movable between the leg portions 86 and 88 about the pin 90 and the axis 92 thereof. Further, the sheet 12 and the fork 78 as a unit are pivotally movable about pin 82 and the axis 84. Axes 84 and 92 are substantially perpendicular to each other and the rod 70, besides being telescopically movable in relation to tubular member 34, is also rotatable within member 34 about axis 52. In a specific embodiment of the neck portion 14 of the glare shield of this invention, fork 78 has a length of one and one-quarter inches, rod 70 has a length of three and one-quarter inches, tubular member 34 has a portion 50 with a length of three-quarters inch and a portion 54 with a length of three inches, and rod 70 and fork 78 have exterior diameters of about five-sixteenths inch, whereas tubular member 34 has an exterior diameter of about three-eighths inch.

In operation, bracket 10 is secured to the windshield molding 92 by means of screws 94 positioned in opening 22 and secured to the vehicle. As illustrated in FIG. 1, the desirable positioning of the mounting bracket 10 is with the socket 28 depending downwardly from the portion 24 which is generally horizontally disposed. Further, the bracket 10 should be positioned such that the sheet 12 may be moved into the positions 96 and 98 shown in dotted lines in FIG. 1 thereby to cover those portions of the windshield adjacent the molding 92 which are not covered by the conventional sun-visor (shown in dotted lines in FIG. 1 and given the reference numeral 100.) Thus shown, the conventional sun-visor 100 can be used to block the sunrays that create glare in positions adjacent the mounting bracket 10 and molding 92 in which the sheet 12 cannot be positioned. Thus, by the combination of the conventional sun-visor 100 and the glare shield of this invention, all areas of the windshield through which objectionable glare can be viewed by the driver can be either blocked or reduced in intensity. Further, when only localized glare is the problem, such as reflected sunlight or the on-coming head lights of another vehicle, only the sheet 12 need be used. Thus, by placing the sheet 12 in the driver's line of sight of the glare-producing object, the glare is reduced and only a small portion of the windshield is obstructed from normal view.

As above-mentioned, once the sheet 12 is positioned as desired, the screws 68 are tightened so as to frictionally secure the ball member 40 in the socket 28 and final adjustment is made by either telescoping the rod 70 in relation to the tubular member 34, rotating the rod 70 in relation to the tubular member 34, pivotally moving the fork portion 78 about axis 84 or pivotally moving the sheet 12 about axis 92. The friction between the pivotal joints of pins 82 and 90 and the friction between the expanded portion 74 of the rod 70 and the tubular member 34 is sufficient that in whatever position sheet 12 is placed, sheet 12 will be held fast against further movement. Further, once the screws 68 which frictionally hold the ball member in the socket 28 are first adjusted, the frictional securance of the ball member 40 in the socket 28 may be selectively chosen such that the ball 40 will move when urged but will remain fast after it is positioned as desired. Thus, constant adjustment of the screws 68 will not be required whenever the ball member 40 is desirably repositioned. Also within the scope of this invention, but not shown, is the provision of the screws 68 with thumb knobs or wing nuts such that the adjustment of the screws 68 above-mentioned is easily achieved without the use of a screwdriver or a like tool.

The bend in the tubular member 34 is provided such that when the glare shield of this invention is mounted as shown in FIG. 1, the sheet 12 can be placed adjacent the interior surface of the windshield and thus not in the way of the driver's head or the hat he may have on. Thus, the bend in the tubular member 34 should generally correspond to the angle at which the conventional windshield is disposed.

The glare shield of this invention as above-described provides means for reducing glare in localized areas. Adjustability is provided in the glare shield such that, in combination with the conventional sun-visor, all areas of the windshield through which glare may be viewed can be either blocked or substantially reduced. Further, when glare is emanating from localized objects, the glare shield may be used alone to minimize such glare and leave a substantial portion of the windshield unobstructed for normal view. Further, the specific shape of the sheet 12, i.e., a parallelogram, with acute and obtuse angles, provides that the sheet 12 will fit most conveniently into those areas of the windshield through which glare may be viewed. The parallel sides of the sheet 12 allow it to be positioned in edge to edge relationship with the sun-visor 100 and at the same time correspond to the angle at which the edge of the road or the center strip 101 of the road appears to be disposed; position 98 shown in dotted lines and the solid line position of sheet 12 in FIG. 1.

While there have been described above the principles of this invention in connection with specific apparatus, it is to be clearly understood that this description is made only by way of example and not as a limitation to the scope of this invention.

What is claimed is:

1. An adjustable glare shield comprising a sheet of uniformly colored, substantially transparent material having uniform glare-reducing properties pivotally and swivelly connected to a mounting bracket with an elongated neck portion therebetween, said sheet generally having a shape of a parallelogram with pairs of opposite corners being acute and obtuse, respectively, said neck portion having a fork with two leg portions positioned on opposite sides of said sheet, respectively, and an end portion spaced apart from said leg portions, pin means extending through said sheet and having its ends secured to said leg portions, respectively, said sheet being movable about the axis of said pin means, a rod having a yoke portion at one end and an opposite end portion remote therefrom, said yoke portion having a pair of arm portions positioned on opposite sides of said fork end portion, pivot means extending through said fork end portion and having its ends secured to said arm portions, respectively, said fork being movable about the axis of said pivot means, said axis of said pin means being substantially perpendicular to said axis of said pivot means, a tubular member having an open end and an opposite end, said open member end telescopically receiving said rod end portion, said rod end portion frictionally engaging the interior of said tubular member whereby said tubular member and rod are frictionally secured together and said rod is capable of rotating and telescoping movement in relation to said tubular member, said mounting bracket being swivelly connected to said opposite member end, said tubular member being bent adjacent said other member end, said pin and pivot means frictionally restraining movement about their respective axes whereby said sheet may be positioned adjacent the interior surface of a vehicle windshield in the line of sight of glare-producing objects and frictionally held against movement therefrom.

2. The glare shield of claim 1 wherein the angle between the portions of said tubular member adjacent said open and opposite member ends is about one hundred fifty degrees, and the acute and obtuse angles of said sheet are about seventy degrees and one hundred ten degrees, respectively.

3. An adjustable glare shield comprising a sheet of substantially transparent material having glare-reducing properties, an elongated neck member and a mounting bracket, said neck member being swivelly connected to said bracket and pivotally connected to said sheet, said sheet being movable with respect to said neck portion in at least two directions, said directions being respectively generally perpendicular to each other, said neck portion having an axis and two elongated members, means slidably connecting said neck portion members together for permitting both rotatable movement about said axis with respect to each other and movement with respect to each other in the longitudinal direction of said neck portion.

4. An adjustable glare shield comprising a sheet of substantially transparent material having glare-reducing properties, an elongated neck member and a mounting bracket, said neck member having first, second and third neck member portions, first means for pivotally connecting said first neck member portion to said sheet, second means for pivotally connecting said first neck member portion to said second neck member portion, said first and second means each having a pivot axis, said pivot axes of said first and second means being spaced apart and disposed generally perpendicular and parallel to each other, said second and third neck member portions being positioned generally coaxially of each other, means associated with said second and third neck member portions for frictionally holding the same in said coaxial position and at the same time permitting both sliding telescoping movement and sliding rotational movement therebetween when desired, said third neck member portion being swivelly connected to said mounting bracket.

References Cited

UNITED STATES PATENTS 2,658,793    11/1953    Sinclair    296—85

FOREIGN PATENTS

| 665,300 | 9/1929 | France. |
|---|---|---|
| 1,016,860 | 11/1952 | France. |
| 1,053,397 | 2/1954 | France. |
| 323,618 | 1/1930 | Great Britain. |
| 475,136 | 11/1937 | Great Britain. |

BENJAMIN HERSH, *Primary Examiner.*

J. A. PEKAR, *Assistant Examiner.*